United States Patent [19]
Staerker

[11] Patent Number: 5,455,767
[45] Date of Patent: Oct. 3, 1995

[54] CONTROL AND METHOD FOR CONTROLLING A MOTOR VEHICLE DRIVE HAVING AN AUTOMATIC TRANSMISSION

[75] Inventor: Klaus Staerker, Neutraubling, Germany

[73] Assignee: Siemens Aktiengesellschaft, Munich, Germany

[21] Appl. No.: 944,057

[22] Filed: Sep. 11, 1992

[30] Foreign Application Priority Data

Sep. 11, 1991 [EP] European Pat. Off. .............. 91115372

[51] Int. Cl.$^6$ .............................................. B60K 31/00
[52] U.S. Cl. ...................... 364/424.1; 477/120; 477/80; 477/904; 477/155; 192/3.58; 192/3.3; 192/4 R; 74/745; 74/369; 74/625; 364/426.02
[58] Field of Search ............................ 364/424.1, 431.03, 364/431.04, 426.02, 426.01; 74/866, 867, 862, 862, 843, 74, 745, 369, 625; 192/0.052, 3.58, 60, 3.3, 4 R, 73; 477/109, 69, 120, 78, 124, 129, 905, 122, 155, 86, 80, 128, 154, 904

[56] References Cited

U.S. PATENT DOCUMENTS

| | | | |
|---|---|---|---|
| 4,261,229 | 4/1981 | Mizuno et al. | 74/866 |
| 4,285,252 | 8/1981 | Yamaki et al. | 74/866 |
| 4,599,917 | 7/1986 | Leorat et al. | 477/120 |
| 4,614,258 | 9/1986 | Fukunaga | 192/73 |
| 4,700,305 | 10/1987 | Lotterback et al. | 364/431.03 |
| 4,944,193 | 7/1980 | Harada et al. | 74/15.86 |
| 5,097,725 | 3/1992 | Sawa | 74/866 |
| 5,128,868 | 7/1992 | Imai et al. | 364/424.1 |
| 5,151,861 | 9/1992 | Danno et al. | 364/426.02 |
| 5,166,879 | 11/1992 | Greene et al. | 364/424.1 |

FOREIGN PATENT DOCUMENTS 2852195  6/1980  Germany.

*Primary Examiner*—Kevin J. Teska
*Assistant Examiner*—Jacques H. Louis-Jacques
*Attorney, Agent, or Firm*—Herbert L. Lerner; Laurence A. Greenburg

[57] ABSTRACT

A control for a motor vehicle drive having an automatic transmission includes a circuit configuration for generating an output signal adapting shifting points to a load state of the motor vehicle from an evaluation of a power takeoff rpm of the transmission or of a variable equivalent to it. The circuit configuration ascertains a deviation between a calculated and a measured power takeoff rpm in successive time intervals and forms a correction term by multiplication with a factor. At least one characteristic curve memory stores shifting points of the transmission. The at least one characteristic curve memory receives the correction term as an output signal for adapting a characteristic curve to the load state. In a method for controlling a vehicle drive having an automatic transmission, shifting points or characteristic curves for shifting are varied as a function of driving parameters. A power takeoff rpm of the transmission or a variable equivalent to it is evaluated in successive time intervals to obtain an output signal. Characteristic curves for shifting are adapted to a prevailing load state with the output signal.

7 Claims, 3 Drawing Sheets

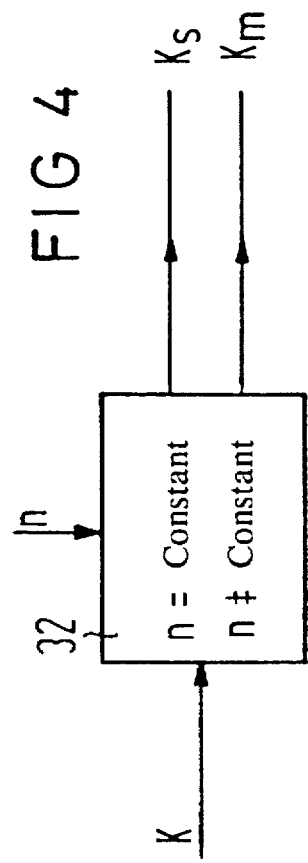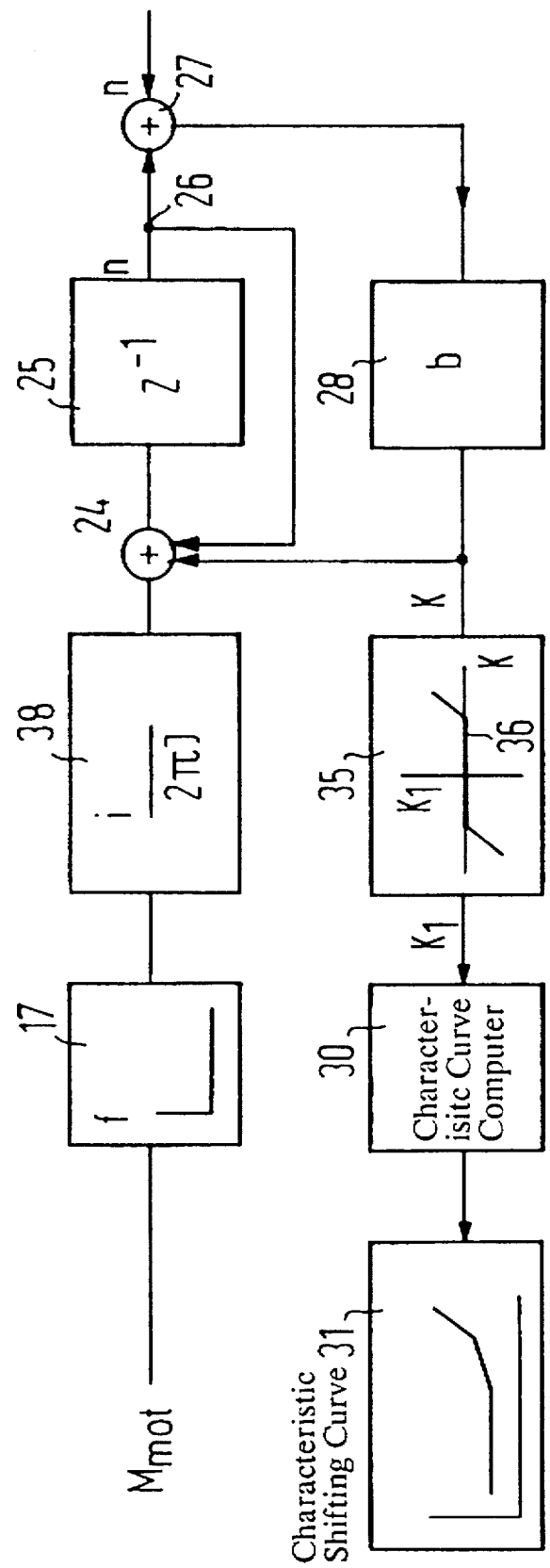

1

CONTROL AND METHOD FOR CONTROLLING A MOTOR VEHICLE DRIVE HAVING AN AUTOMATIC TRANSMISSION

SPECIFICATION

The invention relates to a control for a motor vehicle drive having an automatic transmission, including at least one characteristic curve memory in which shifting points of the transmission are stored, and a circuit configuration by which an output signal is generated from an evaluation of the power takeoff rpm of the transmission or of a variable equivalent to it, by which the shifting points are adapted to a load state of the motor vehicle. The invention also relates to a method for controlling a vehicle drive having an automatic transmission, in which shifting points or characteristic curves for shifting are varied as a function of driving parameters.

Particularly when used in modern electronic transmission controls, such control units must be capable of taking the applicable load state of the motor vehicle into account when defining the shifting points of the transmission. On one hand the load state depends on the variable loading of the motor vehicle and on the other hand on the applicable inclination of the roadway, or in other words on whether the vehicle is traveling uphill, downhill, or along a flat stretch. If the shifting points of the transmission are defined by using stored characteristic shifting curves, then the adaptation to the load state is performed by displacing the characteristic shifting curves.

In a control system known from German Published, Non-Prosecuted Application DE-OS 28 52 195, the adaptation of the shifting points is performed by calculating a command acceleration, by comparing it with the actual acceleration at that time and by selecting one shifting point from a number of possible shifting points as a function of the outcome of the comparison. In that calculation, a number of assumptions must be made, such as the vehicle mass, which as a rule is not accurately known.

It is accordingly an object of the invention to provide a control and a method for controlling a motor vehicle drive having an automatic transmission, which overcome the hereinafore-mentioned disadvantages of the heretofore-known devices and methods of this general type and which make it possible to recognize different load states and changed running resistances and roadway inclinations, merely by evaluating the vehicle speed or the transmission power takeoff rpm. The characteristic curves for shifting, or shifting points, are adapted with a signal generated on the basis of this evaluation.

With the foregoing and other objects in view there is provided, in accordance with the invention, in a motor vehicle drive having an automatic transmission, a control for the motor vehicle drive comprising a circuit configuration for generating an output signal adapting shifting points to a load state of the motor vehicle from an evaluation of a power takeoff rpm of the transmission or of a variable equivalent to it; the circuit configuration ascertaining a deviation or difference between a calculated and a measured power takeoff rpm in successive time intervals and forming a correction term by multiplication with a factor; and at least one characteristic curve memory in which shifting points of the transmission are stored; the at least one characteristic curve memory receiving the correction term as an output signal for adapting a characteristic curve to the load state.

In accordance with another feature of the invention, the circuit configuration includes a subtraction element forming the deviation between an estimated and the measured power takeoff rpm; a multiplier connected to the subtraction element for forming the correction term from the deviation or difference and the factor; and an adder connected to the multiplier for adding the correction term to the next respective estimated power takeoff rpm.

In accordance with a further feature of the invention, the circuit configuration is a differential equation evaluation circuit having a first multiplier, a first adder connected downstream of the first multiplier, a second multiplier connected downstream of the first adder, a second adder connected downstream of the second multiplier, and one delay element connected downstream of the second adder, for ascertaining a new value for the power takeoff rpm from parameters present in the transmission control.

In accordance with an added feature of the invention, the circuit configuration includes a characteristic curve memory connected upstream of the first multiplier, from which a turbine moment can be derived as a function of an engine moment, an engine rpm, and a turbine rpm.

In accordance with an additional feature of the invention, the circuit configuration includes a characteristic curve memory connected upstream of the first adder, from which a moment of resistance acting upon the motor vehicle during travel can be derived as a function of the transmission power takeoff rpm or a motor vehicle speed.

With the objects of the invention in view, there is also provided, in a method for controlling a vehicle drive having an automatic transmission, in which shifting points or characteristic curves for shifting are varied as a function of driving parameters, the improvement which comprises evaluating a power takeoff rpm of the transmission or a variable equivalent to it in successive time intervals to obtain an output signal; and adapting characteristic curves for shifting to a prevailing load state with the output signal.

In accordance with a concomitant mode of the invention, there is provided a method which comprises carrying out the step of evaluating the power takeoff rpm by measuring an actual value of the power takeoff rpm and subtracting the actual value of the power takeoff rpm from a computer-estimated value to form a deviation, multiplying the deviation or difference by a factor to form a correction term, and adding the correction term to the next applicable estimated value.

The advantages of the invention especially reside in the fact that in order to control the shifting events, only operating parameters that are already present in an electronic transmission control system are needed.

Other features which are considered as characteristic for the invention are set forth in the appended claims.

Although the invention is illustrated and described herein as embodied in a control and a method for controlling a motor vehicle drive having an automatic transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 4 is a block circuit diagram of a different embodiment of the circuit configuration of FIG. 3; and FIG. 5 is a schematic and block circuit diagram of another exemplary embodiment of a circuit configuration of FIG. 2.

Figure 1:
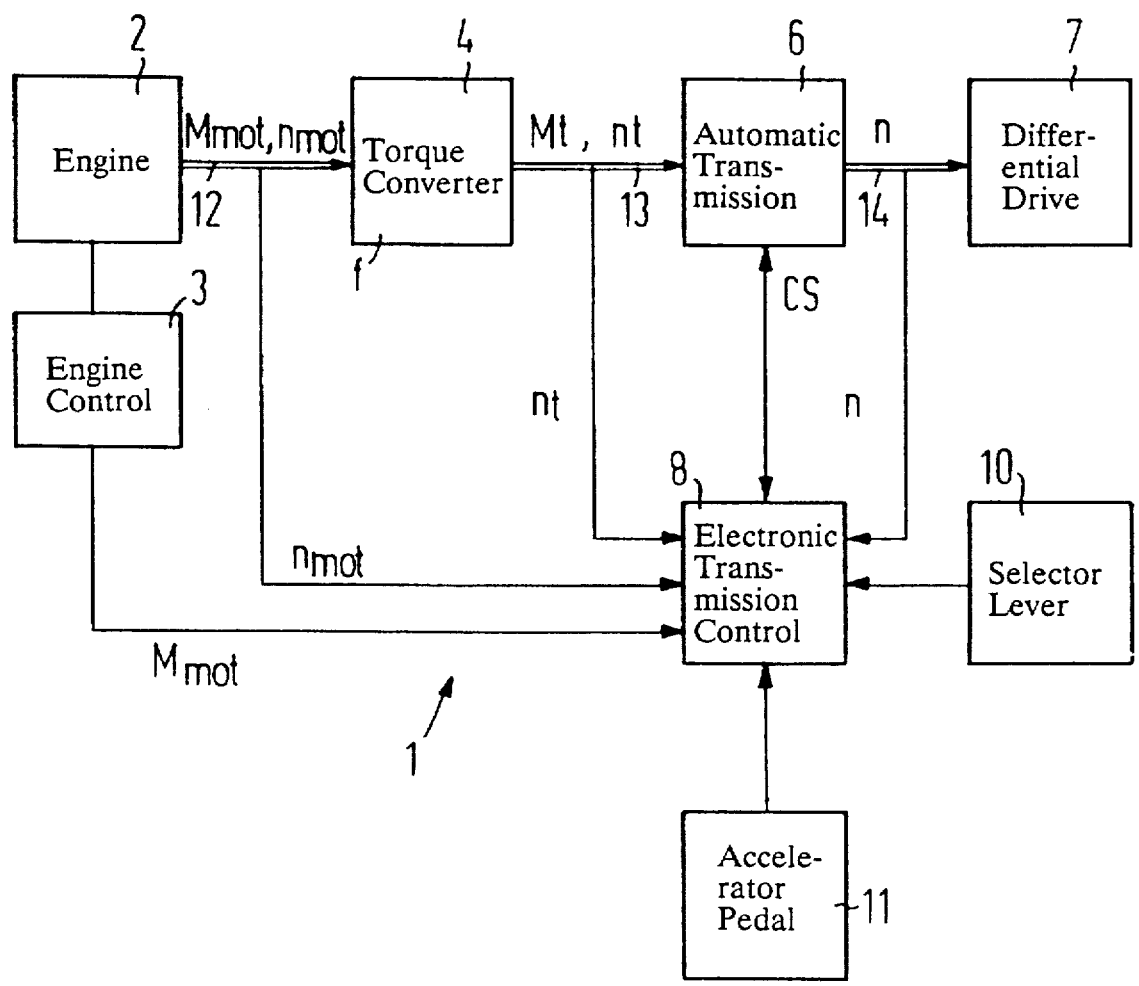
FIG. 1 is a block circuit diagram of a control according to the invention.

Referring now to the figures of the drawing in detail and first, particularly, to FIG. 1 thereof, there is seen a diagrammatically illustrated motor vehicle drive 1 which substantially includes an engine 2 that is controlled by an engine control 3. An engine torque or engine moment $M_{mot}$ output by a crankshaft 12 of the engine 2 and a rotary motion characterized by an engine rpm $n_{mot}$, are carried by a torque converter 4 to an input shaft 13 of an automatic transmission 6, which they reach in the form of a turbine moment $M_t$ and a turbine rpm $n_t$.

The rotary motion is transmitted with a power takeoff rpm or output speed $n_{ab}$ by a power takeoff or driven shaft 14 of the transmission 6 to a differential drive 7. As is the case for other vehicle parts which are not affected by the invention, an associated driven axle is not shown in the drawing.

The automatic transmission 6 is controlled by a transmission control 8, which in turn receives commands from a driver through a selector lever 10 and an accelerator pedal 11. As is represented by corresponding signal lines, the transmission control 8 also receives information regarding the engine moment $M_{mot}$, the engine rpm $n_{mot}$, the turbine rpm $n_t$ and the transmission power takeoff rpm $n_{ab}$. The transmission control 8 also receives information from the transmission 6 and sends control signals CS to the transmission that control shifting events in the transmission.

The signal and control lines are represented by single lines in FIG. 1, while the mechanical shafts, namely the crankshaft 12, the transmission input shaft 13 and the transmission power takeoff shaft 14, are represented by double lines.

The longitudinal motion of a motor vehicle can be described by the following equations:

$$\frac{dn_{ab}}{dt} = \frac{i_{gang} * M_t - M_w}{2\pi J} \quad \text{Equation 1}$$

$$M_t = f_{wand}(M_{mot}, n_{mot}, n_t) \quad \text{Equation 2}$$

All of the physical variables contained in these equations refer to the power takeoff shaft 14. Unless otherwise defined, these variables are as follows:

| | |
|---|---|
| $i_{gang}$ | the transmission ratio for the gear selected, at the time, |
| $M_w$ | the moment of resistance of the vehicle, |
| J | the moment of inertia of the vehicle, |
| $f_{wand}$ | the characteristic curve of the torque converter. |

The following variables are also used for the equations given below:

| | |
|---|---|
| T | regularly repeating time interval after which measurements and calculations are redone, |
| k * T | the applicable current measuring and calculation instant, |
| (k + 1)*T | the next applicable measuring and calculation instant, |
| F | the deviation or difference between a predicted and a measured speed or transmission power takeoff rpm, |
| b | a factor by which the deviation or F is multiplied, |
| K | a correction term with which the predicted speed is corrected, |
| $K_m$ | the proportion of K that is based on the change in mass of the vehicle, and |
| $K_s$ | the proportion of K that is based on the variable inclination of the roadway. |

If all of the variables contained in the equations were known exactly, then the transmission power takeoff rpm and thus the speed of the motor vehicle could be calculated in advance for a given engine moment. In practice, however, only some of the variables are known. In the moment of resistance $M_w$, only the speed-dependent values of the air resistance and the rolling resistance are detected in approximate form. In particular, the torques that arise when driving uphill or downhill are not known. The moment of inertia J of the vehicle, referred to the transmission power takeoff shaft, is likewise not accurately known, because of the variable load state. In contrast, as already noted, with now-conventional electronic transmission controls, information is available regarding the engine moment, the engine rpm, the turbine rpm and the power takeoff rpm of the transmission. In the control of the invention, an output signal that depends on the load state of the vehicle and on the inclination of the roadway is generated as follows.

Figure 2:
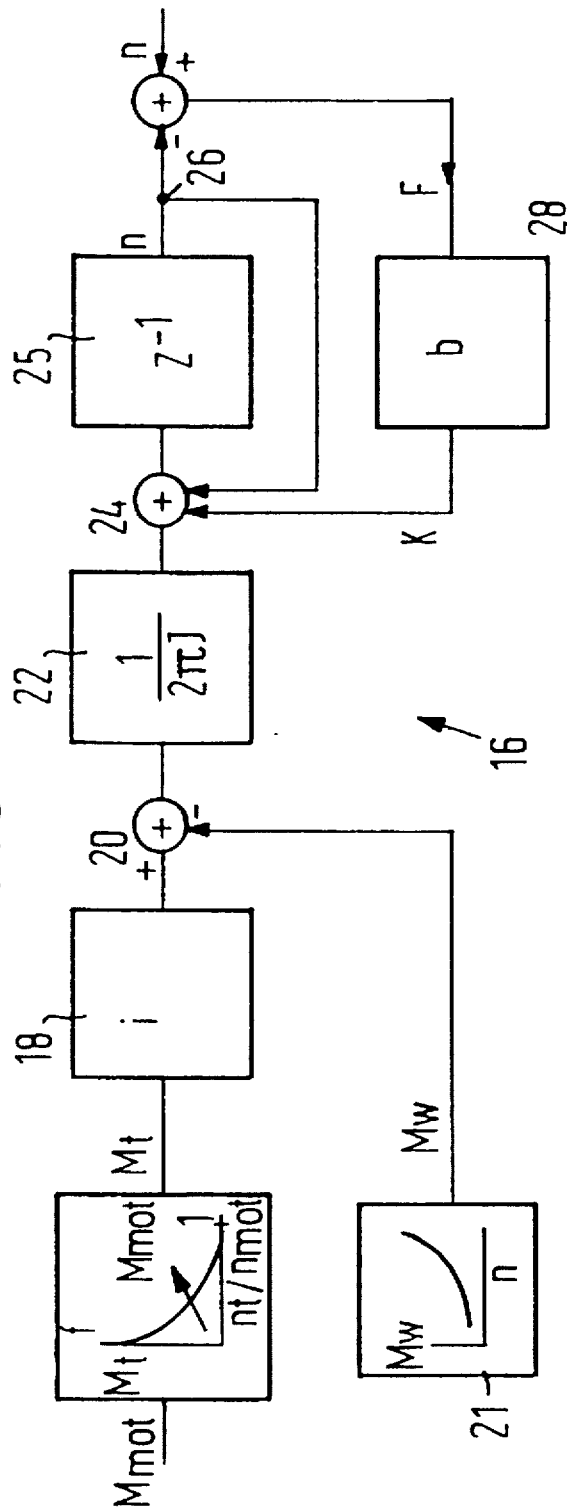
FIG. 2 is a schematic and block circuit diagram of a configuration that is part of the control of FIG. 1.

FIG. 2 shows a differential equation evaluation circuit configuration 16 belonging to the electronic transmission control 8, that has a first characteristic curve memory 17 in which the torque converter characteristic curve $f_{wand}$ is stored, specifically in the form of stored numerical values or in the form of a computing instruction. Conceptually, the converter characteristic curve represents a diagram in which a ratio $n_t/n_{mot}$ is the abscissa, the engine torque $M_{mot}$ received from the engine control is a parameter, and the turbine torque $M_t$ is the ordinate. The turbine moment $M_t$ is supplied at the output of the characteristic curve memory 17 and reaches a first multiplier 18, in which it is multiplied by the value $i_{gang}$ for the transmission ratio in the particular gear at the time. The product is forwarded to a positive input of a first adder 20. The values of the moment of resistance $M_w$ are stored in a second characteristic curve memory 21 as a function of the speed or of the transmission power takeoff rpm $n_{ab}$. However, the moment of resistance can also be calculated from this speed or rpm. It is sent to a negative input of the adder 20, which thereupon forms a subtraction.

An output signal of the adder 20 reaches a second multiplier 22, in which it is multiplied by $1/(2*\pi*J)$, and the result is transmitted to a second adder 24. An output signal of the adder 24 reaches a delay element 25, and a chronologically delayed signal present at an output 26 thereof is fed back to the adder 24 and thus to the input of the delay element 25.

The following differential equation is thus solved in the circuit configuration:

$$n_{ab}((k + 1)*T) = n_{ab}(k*T) + \frac{i_{gang} * M_t - M_w}{2\pi J} \quad \text{Equation 3}$$

Equation 3 corresponds to the differential equation 1, but in this form it can easily be solved either in a computer or in a digital circuit configuration. In this case the delay element 25 replaces an integrator that is necessary to solve equation 1.

With the differential equation 3, at each time k*T, a new "estimated" or "predicted" transmission power takeoff rpm for the next measuring time (k+1)*T is calculated from the known variables. A calculated value $n_{ab,ber}$ is compared with a value $n_{ab,gem}$ measured at that instant, or in other words the two values are supplied to respective negative and positive inputs of an adder 27. If the variables processed in the circuit configuration 16 do not match, either because the vehicle mass has changed or because the moment of resistance does not have the assumed value because the vehicle is driving uphill or downhill, then the rpm calculated in advance will not match the measured rpm (or speed). A conclusion as to the changed parameters can be drawn from the resultant deviation or error. The deviation F $$F = n_{ab,\,gem} - n_{ab,\,ber} \qquad \text{Equation 4}$$

is multiplied in a multiplier 28 by a predetermined correction factor b, and the resultant correction term K $$K = b * F \qquad \text{Equation 5}$$

is added to the next predicted or calculated speed:

$$n_{ab}((k+1)*T) = n_{ab}(k*T) + \frac{i_{gang} * M_{mot} - M_w}{2\pi J} \qquad \text{Equation 6}$$

If the vehicle is driving uphill, then the predicted power takeoff rpm will be larger than the measured one, because of the climbing forces. The result is a negative correction term K. Correspondingly, a positive correction term is obtained when driving downhill. The amount of the correction term is a measure of the angle of inclination.

On the other hand, if the vehicle is heavily loaded, then the acceleration will be less than in the unloaded state, for the same engine torque. A negative correction term K will therefore be the result once again during the acceleration. In unaccelerated travel on a flat road, the value of the correction term is 0.

Figure 3:
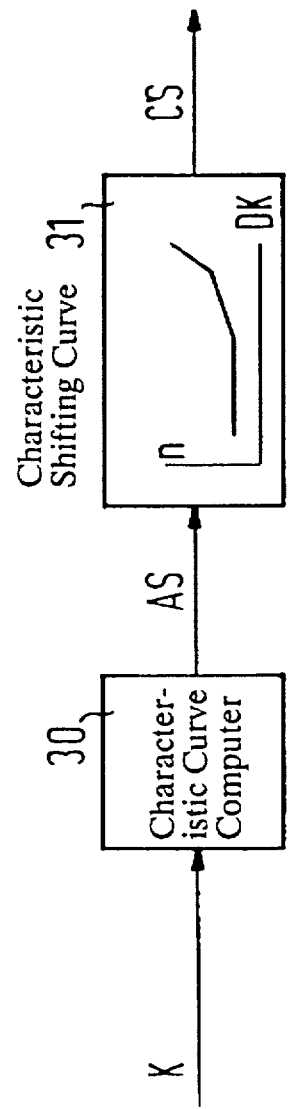
FIG. 3 is a block circuit diagram of a further circuit configuration of the control of FIG. 1.

FIG. 3 shows that the correction term K is fed to an input of a characteristic curve computer 30, which generates an output signal AS that is delivered to a characteristic shifting curve memory 31 and in it effects an adaptation of the shifting characteristic curves to the prevailing load state. For instance, when driving uphill, shifting to the next higher gear will be carried out at higher power takeoff rpm than when traveling on a flat road. Arbitrary adaptation of the shifting characteristics to the load state can be performed with the aid of the correction term K. The control signal CS with which the shifting is carried out in the transmission 6 is generated at an output of the characteristic shifting curve memory 31.

If the vehicle mass increases, there is an analogous change in the shifting characteristics. This change is necessary only during the phases of acceleration. If the vehicle mass has changed and the vehicle is traveling on a flat road, the correction term K in fact returns to 0 as soon as the speed is again constant.

As is seen in FIG. 4, the correction term K may be delivered to a discriminator circuit 32, which makes it possible to discriminate between an increased load and a roadway slope.

To that end, the rpm nab is measured repeatedly in succession. If it is constant and if a correction term K occurs, then the vehicle is without doubt traveling uphill or downhill. In that case, the discriminator circuit 32 transmits a correction term $K_s$ for an uphill slope. In contrast, if a correction term occurs only at varying speed but not at constant speed, then there is no slope in the roadway. In the phases of acceleration, or in other words when the rpm is not constant, the discriminator circuit 32 then transmits a correction term for mass $K_m$, which is dictated only by the altered load of the motor vehicle. Changing driving states of the motor vehicle are detected by successive measurement and carrying out of this kind of discrimination.

FIG. 5 shows another embodiment of a circuit configuration 34 which may be used whenever there is no information available on the moment of resistance $M_w$. In such a case, the deviation that results from the calculation using equation 3 will be greater than for a known moment of resistance. The circuit configuration 34 has a limiter element 35, which enables discrimination as to whether the ascertained correction term K is based on the missing moment of resistance or on altered load states of the motor vehicle. If the correction term is changing within a certain range of tolerance, no correction term is generated. This is represented in the block circuit diagram of the limiter element 35 by a horizontal region 36 of the function. If, in contrast, the correction term K is outside the range of tolerance, then an effective correction term $K_1$ is generated which effects a displacement or adaptation of the characteristic shifting curves in the characteristic shifting curve memory 31 through the characteristic curve computer 30, as is described above. Otherwise, the circuit configuration 34 is equivalent to the circuit configuration 16, although in it the multipliers 18 and 22 have been replaced by one multiplier 38, which carries out the same function.

Varying the characteristic curves can be performed in various ways. For instance, a plurality of sets of characteristic curves can be stored in memory, of which one at a time is selected as a function of the value of the correction term K. Alternatively, only one set of characteristic curves may be stored in memory, which then is varied steadily in accordance with an algorithm as a function of the prevailing value of the correction term.

As already indicated, instead of the transmission power takeoff rpm $n_{ab}$, it is also possible to evaluate the vehicle speed, which is proportional to it. In that case, the equations must be recalculated for the applicable variables.

I claim:

1. In a motor vehicle drive having an automatic transmission, a control for the motor vehicle drive comprising:

a circuit configuration for generating an output signal adapting shifting points to a load state of the motor vehicle from an evaluation of a value representative of a power takeoff rpm of the transmission;

said circuit configuration including means for ascertaining a deviation between a calculated and a measured power takeoff rpm in successive time intervals and for forming a correction term by multiplication with a factor; and at least one characteristic curve memory in which characteristic curves representing shifting points of the transmission are stored;

said at least one characteristic curve memory receiving the correction term and outputting a characteristic signal for adapting the characteristic curves to the load state.

2. The control according to claim 1, wherein said circuit configuration includes:

a subtraction element forming the deviation between the calculated and the measured power takeoff rpm;

a multiplier connected to said subtraction element for forming the correction term from the deviation and the factor; and an adder connected to said multiplier for adding the correction term to the next respective estimated power takeoff rpm.

3. The control according to claim 1, wherein said circuit configuration is a difference equation evaluation circuit having a first multiplier, a first adder connected downstream of said first multiplier, a second multiplier connected downstream of said first adder, a second adder connected downstream of said second multiplier, and one delay element connected downstream of said second adder, for ascertaining a new value for the power takeoff rpm from parameters present in the transmission control.

4. The control according to claim 3, wherein said circuit configuration includes a characteristic curve memory connected upstream of said first multiplier, from which a turbine moment can be derived as a function of an engine moment, an engine rpm, and a turbine rpm.

5. The control according to claim 3, wherein said circuit configuration includes a characteristic curve memory connected upstream of said first adder, from which a moment of resistance acting upon the motor vehicle during travel can be derived as a function of the transmission power takeoff rpm or a motor vehicle speed.

6. In a method for controlling a vehicle drive having an automatic transmission, in which shifting points or characteristic curves for shifting are varied as a function of driving parameters, the improvement which comprises:

evaluating a value representative of a power takeoff rpm of the transmission in successive time intervals to obtain an output signal; and adapting characteristic curves for shifting to a prevailing load state with the output signal.

7. The method according to claim 6, which comprises carrying out the step of evaluating the power takeoff rpm by:

measuring an actual value of the power takeoff rpm and subtracting the actual value of the power takeoff rpm from a computer-estimated value to form a deviation, multiplying the deviation by a factor to form a correction term, and adding the correction term to the next applicable estimated value.

* * * * *